United States Patent [19]

Bronicki et al.

[11] Patent Number: 4,470,544
[45] Date of Patent: Sep. 11, 1984

[54] METHOD OF AND MEANS FOR WEATHER MODIFICATION

[75] Inventors: Lucien Y. Bronicki; Gad Assaf, both of Rehovot, Israel

[73] Assignee: Geophysical Engineering Co., Seattle, Wash.

[21] Appl. No.: 174,931

[22] Filed: Aug. 4, 1980

[51] Int. Cl.³ .............................................. A01G 15/00
[52] U.S. Cl. .................... 239/2 R; 60/641.7; 417/331
[58] Field of Search ............... 60/641.7; 639/2 R, 14; 417/331

[56] References Cited

U.S. PATENT DOCUMENTS 3,465,964  9/1969  Girden .................................. 239/2 R
3,683,627  8/1972  Girden .
4,245,475  1/1981  Girden .................................. 60/641.7

Primary Examiner—Stephen F. Husar
Attorney, Agent, or Firm—Sandler & Greenblum

[57] ABSTRACT

The weather near a continental arid zone is modified by increasing the heat storage of the seas westwardly of the arid zone during the summer. The heat storage is increased by mixing the relatively warmer surface water with relatively cooler deeper water thereby reducing the surface temperature of the seas during the summer. Cooling the surface of the water will increase the radiant heat flux due to solar radiation and decrease the radiant heat loss from the surface during the summer thus increasing the amount of heat stored in the water an available for evaporation during the winter. Mixing is achieved by pumping water from a lower level in the seas to the upper level. In one embodiment of the invention, normal wave motion provides the mode of power for the pumping operation. In another embodiment, mixing is achieved by a paddle that is operated by wave motion.

12 Claims, 4 Drawing Figures

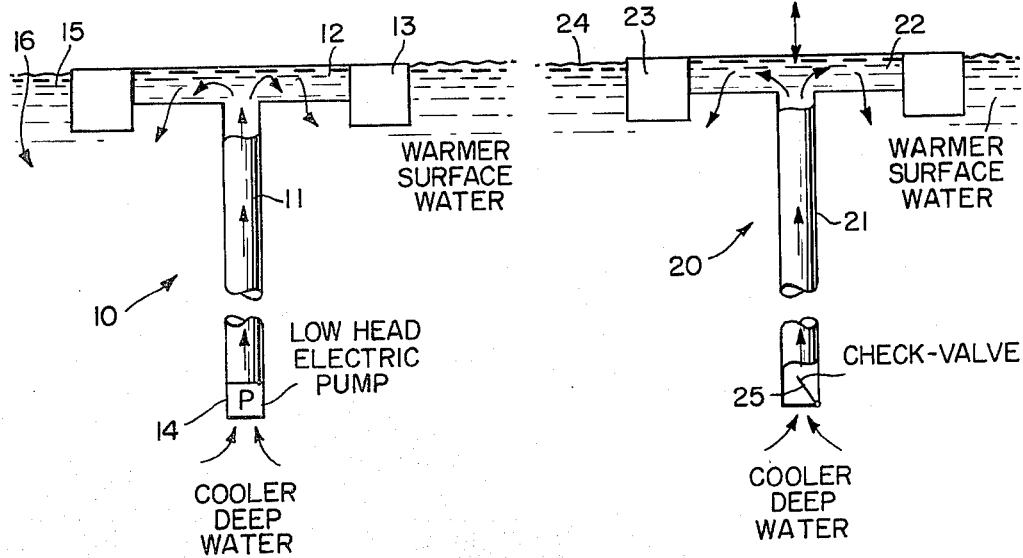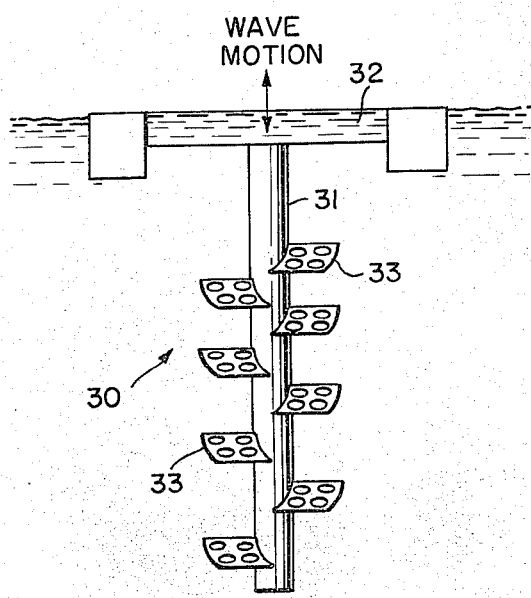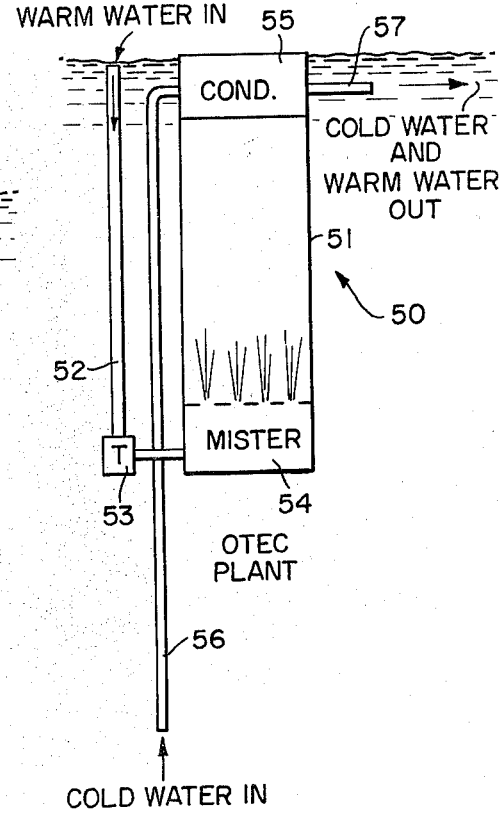

4,470,544

METHOD OF AND MEANS FOR WEATHER MODIFICATION

DESCRIPTION

TECHNICAL FIELD

This invention relates to a method of and means for modifying weather near continental arid zones.

BACKGROUND OF THE INVENTION

The presence of large bodies of water, such as oceans, seas or large lakes, affects the weather in adjacent westwardly located land masses due to prevailing westerly winds. The effect is illustrated by comparing winter weather conditions between Portland, Oreg., on the west coast of the North American continent and Halifax, Nova Scotia on the east coast; or between Bordeaux, France near the west coast of the European continent with Vladivostok, USSR on the east coast of the Asian continent. Each of these cities is located at approximately 45 degrees north latitude, but winter in the cities on the western coasts of continents is considerably milder than winter in cities on the eastern coasts of continents.

The dominant influence on the climate in the Levantine Basin is the Mediterranean Sea. Winter storms generated over the Mediterranean Sea carry moisture westwardly over Israel, Lebanon, Syria, Turkey and Iran where the moisture precipitates as rain. The area south of the Mediterranean, which is not influenced by winter storms, constitute the world's largest desert areas.

Winter storms in the Mediterranean are generated when cold continental air masses from the north approach the relatively warm sea. The heating of the air mass is the key element for intensive evaporation from the sea and resultant inland precipitation. As the cool air is heated by the relatively warm Mediterranean Sea in wintertime, the air becomes lighter and rises, moving westwardly over the Levant. During winter storms, the Mediterranean Sea gives up heat which had been stored from the summer in the form of the latent of evaporation. The heat stored from the summer in the upper layer of the Mediterranean Sea is the major energy source for winter storms.

A comparison of winter and summer temperature profiles in the Eastern Mediterranean show that in wintertime, the temperature of a column of water forty meters deep in the Mediterranean decreases by some 10 degrees Celsius. This amounts to a net heat flux of about 170 Watts/m$^2$. During the wintertime, the total solar radiation in flux in this area of the world is about 120 Watts/m$^2$. Thus, the seasonal heat storage provided by the Mediterranean Sea is the dominant factor that initiates winter storms by which precipitation is spread over the Levantine basin and is the dominant factor establishing the Levant climate.

While there has been consider talk about the weather in the Levantine Basin, very little has been done to increase winter precipitation. It is therefore an object of the present invention to provide a method of and means for modifying weather near continental arid zones.

DISCLOSURE OF INVENTION

The present invention provides a method for modifying the weather near a continental arid zone by increasing the heat storage of the seas westwardly of said zone during the summertime. The heat storage of the seas is increased by mixing the relatively warmer surface water with relatively cooler deeper water to thereby reduce the surface temperatures of the seas during the summertime. Reduction of surface temperature will enhance the solar heat flux thereby increasing seasonal heat storage. In addition, reduction of the surface temperature of the sea near coastal areas in the summer will modify the weather in the coastal region because the summer air temperature over the sea follows the water temperature; and with this reduction in temperature, the summer air temperature in the coastal region will be reduced. Consequently, the energy expenditure for air conditioning in the summertime will be reduced. The heat flux to the surface of a large body of water such as the Mediterranean Sea, is a remnant of two opposite, very large, energy fluxes: the global radiation rate from the sun and the atmosphere to the water surface, and the outgoing radiation latent heat flux and sensible heat flux from the water surface. The radiation flux into the surface is almost independent of the surface sea temperature; but the outgoing evaporation rate and radiation and sensible heat flux is very sensitive to the temperature of the surface of the water. The lower the temperature of the water surface, the smaller will be the outgoing radiation because the radiation is proportional to the fourth power of the temperature. It can be shown that by reducing the surface temperature of the Mediterranean Sea by 3 degrees Celsius, the outgoing heat flux will be reduced by about 120 Watts/m$^2$. Such a large reduction over a very large area of the sea will multiply the seasonal storage capacity of the Mediterranean Sea and thus modify the climate in the Levantine Basin.

In order to cool the surface of the sea in the summertime, the present invention contemplates mixing surface water with cooler deep water, this being achieved by pumping water from a lower level of the sea to the upper level. Preferably, this is achieved by wave motion which permits two modes for the pumping operation. In one embodiment, the mixing is achieved by paddles that are operated by wave motion. In another embodiment, the wave motion is utilized as a pump for lifting deep water to the surface.

BRIEF DESCRIPTION OF DRAWINGS

Embodiments of the present invention are shown in the accompanying drawings wherein:

FIG. 1 is a schematic side view, in section, of an electrically operated pump for mixing cooler deep water into warmer surface water;

FIG. 2 is a schematic side view, in section, of a wave operated pump for mixing cooler deep water with surface water;

FIG. 3 is a schematic side view of an embodiment of the invention wherein mixing is acheived by a wave-operated mixer; and FIG. 4 is a schematic of a mist-transport process ocean thermal energy converter modified to provide weather modification.

BEST MODE FOR CARRYING OUT THE INVENTION

Taking the Eastern Mediterranean Sea as an example, it is known that the summer heating zone is limited to a layer of water from 40 to 80 meters deep. In order to increase the heat storage of this layer, dense water from say 100 meters deep is pumped to the surface across the water in the heat storage zone which is lighter than the deep water. The difference in density between the water at a depth of 100 meters and the water near the surface is about 1.5 Kg/m$^3$. The total head is thus only about 15 cm of water. Assuming that friction and pumping losses require another 25 cm of water, the total pumping will be approximately 0.4 m.

The temperature of the deep water pumped to the surface will increase about 8 degrees Celsius by reason of the solar radiation input to the Sea during the summertime which amounts to about 33,600 joule/Kg. If it is assumed that 70% of this heat is available during the wintertime for evaporating water, then such amount of heat will evaporate approximately 10 grams of fresh water from which about 50% or 5 grams will precipitate over the Levantine Basin. Thus, each joule of mechanical energy will produce about 1.25 grams of fresh water over the Levantine Basin. Such energy amounts to about 0.22 Kwhr/m$^3$. This is an extremely efficient way of producing fresh water and is much more efficient than any large scale desalinization plant presently known. For example, the least energic desalinization process is based on the reverse osmosis process and it consumes some 4-8 Kwh/m$^3$.

In one embodiment of the present invention, conventional pumping of the deep water can be utilized. Apparatus for carrying out this technique is illustrated in FIG. 1 to which reference is now made. Reference numeral 10 designates a pump according to the present invention for raising cooler deep water to the surface of a sea. Specifically, apparatus 10 comprises a vertically oriented pipe 11 to the upper axial end of which is connected chamber 12 which is supported at its periphery by floats 13 arranged such that pipe 11 is vertically oriented with chamber 12 at the surface 15 of the body of water 16. Pipe 11 is approximately 100 meters in length by about 5 meters in diameter.

A conventional low head electrically operated pump 14 is provided in the pipe for the purpose of pumping cooler deep water from a depth of about 100 meters to the surface and into chamber 12 which acts as a distributor at th surface for pumped deep water. Chamber 12 is a hollow member containing a plurality of holes each of which is several centimeters in diameter through which the cool deep water will flow as small jets and mix with the surface sea water. If the actual head of the water in the chamber is about 5 cm, the jet velocity will be about 1 m/second. The total area of the holes in the chamber 12 should be about twice the area of the pipe. This calls for a chamber that will have a cross section of about 10 times larger than the cross-section of the pipe, i.e., some 15 meters in diameter for a 5 meter diameter pipe.

In this embodiment, the electrical load will be approximately 4000 joules per cubic meter of water pumped to the surface. As indicated previously, this enhances fresh water production with an order of magnitude less energy than that required in the most energy efficient desalinization process presently known. In this case, the fresh water recovery is in the form of additional rain that will fall during the rainy season as a consequence of the increased heat available to sustain winter storms.

On the average, about $20 \times 10^9$ m$^3$ are precipitated each year in the south of Levantine Basin. This volume of water can be increased by 10% by distributing say 5,000 mixers of the type shown in FIG. 1 along about 100 Km of the eastern coast line of the Mediterranean Sea, each having a pipe about 2 m in diameter by about 100 m long with a 20 Kw pump for pumping about 5 m$^3$/sec of cool, deep water to the surface during the summer. Assuming this water is about 15 degrees Celsius, about 25,000 m$^3$/sec of deep water at this temperature will mix with about double this volume of surface water at about 25 degrees Celsius producing about 75,000 m$^3$/sec of water at about 22 degrees Centigrade. The pumps will consume about 100 mw of power for say the six warmer months of the year which will require about $4.4 \times 10^8$/KWhr of power. Inasmuch as 0.22 KWhr are required to produce a cubic meter of fresh water as precipitation, the arrangement described above will produce about $2 \times 10^9$ m$^3$ of increased precipitation, or about 10% of the natural precipitation.

Because the summer air temperature over the sea follows the water temperature, the above described mixing will reduce the sea temperature and consequently will reduce the summer temperature in coastal cities like Tel Aviv. Thus, a secondary effect is achieved by increasing the heat storage capacity of the sea during the summer in order to increase precipitation in the winter: modification of the weather in the summer in costal cities by reducing summertime temperatures. As a consequence of this type of weather modification, electrical requirements for summer air conditioning will be reduced thus compensating for the electrical input required in the summer to power a deep water pumping operation.

To protect the apparatus from winter storms, the mixers can be towed to a protected bay for maintenance and repair just before the onset of warm weather, the mixers will be towed out to their stations along the coast.

Referring now to FIG. 2, reference numeral 20 designates a second embodiment of apparatus for mixing deep water with surface water. Apparatus 20 comprises vertically oriented pipe 21 on one axial end of which is attached chamber 22 carrying floats 23 for the purpose of maintaining the apparatus with the chamber near surface 24 of the water with pipe 21 vertically oriented. In this embodiment, the pipe is about 1 meter in diameter by about 100 meters long. At the bottom of the pipe is a one-way check valve which admits water when the apparatus moves downwardly due to wave motion at the surface and which closes when the apparatus moves upwardly. In operation, wave motion at the surface causes oscillation of the vertical pipe with the result that each downward thrust of the apparatus causes a slug of deep water from the lower level to pass through valve 25 into pipe 21, and an equal volume of water at the top of the pipe to pass into chamber 22 which is provided with many holes through which the deep water is distributed at the surface. In this instance, the chamber will be approximately 3 meters in diameter for a one meter diameter pipe. Because the pumping head is relatively small, wave motion can be utilized for pumping purposes.

The wave operated mixer can also be used to significantly increase precipitation. Wave energy in the Mediterranean Sea is, on the average about 5 KW/m (continuously). About 50,000 wave operated mixers distributed along 100 Km of coast line along the Eastern Mediterranean with a net pumping conversion of about 2 KW would provide the same results as the powered mixers described previously. In this case, the pipes would be only about 0.8 m in diameter.

A third embodiment of the invention is illustrated in FIG. 3 where reference numeral 30 represents apparatus for mixing cooler deep water with warmer surface water. In this embodiment of the invention, a vertical rod or pipe 31 is provided on the upper axial end of which is located float 32 for maintaining the rod in a vertically oriented position. Wave motion at the surface of the water will cause the rod to oscillate in the deep water. A plurality of perforated plates 33 axially displaced along the rod 30 serve to beat or stir the deep water creating turbulance which has a mixing effect on th water.

The mixing of surface water with the deep water will increase the nutrient content of the surface water; and, as a consequence, the food chain activity will be amplified. Thus, the resulting upwelling, which is rich with nutrients, will increase the biological activity in the vicinity of the mixing apparatus.

In use, many individual mixers will be provided a given area of the sea during the summertime. As a consequence, a large surface area of the sea will be cooled effecting an increase in absorption of solar radiation during the day in the summertime and reducing radiant heat loss during the night. As indicated above, the increased heat storage achieved by this technique in the summertime will increase the amount of heat given to the cooler air mass in the wintertime, thereby increasing evaporation in the winter and resulting in an increase in precipitation westward of the area of the sea in which the mixers are located.

Ocean thermal energy conversion (OTEC) power plants provide a further means for reducing the temperature of the surface of the water for increasing the solar heat flux. An OTEC power plant is one which utilizes warm surface water as a heat source and cold, deep oceanic water as a heat sink. An OTEC power plant that utilizes a mist-transport process is described in *The Mist Ocean Thermal Conversion Plant*, by Stuart L. Ridgway, Proc. of the 4th Ocean Thermal Energy Conversion Conference, New Orleans, LA, 1977. A block diagram of the OTEC mist-transport process is shown in FIG. 4 to which reference is now made.

Power plant 50 comprises a vertical cylindrical hull some 200 meters deep containing an evacuated vertical lift tube 51. Warm surface water is filtered and dropped through penstock 52 to the lower part of the hull where energy is extracted by hydraulic turbine 53. Water exhausted from the turbine is passed into a mister 54 which sprays fine jets of warm water into the evacuated lift tube 51. Mister 54 serves to break up the jets upon their entrance into the lift tube into uniformly small droplets, a very small percentage of which evaporate. The vapor flows rapidly upwardly to a contact condenser 55 at the top of the lift tube, the condenser being supplied with cold water drawn from the depths of the ocean by intake conduit 56. The moving vapor lifts the mist droplets by aerodynamic drag and both vapor and mist mix with the cold water stream for return to the sea via cold water outlet 57.

For a mist-flow plant using 25 degrees Celsius warm water and 5 degrees Celsius cold water based on cold to warm water flow of 3:1, the mixed water outlet temperature will be about 10 degrees Celsius. In the conventional mist-transport process power plant of the type described in the publication referred to above, the output of the condenser is returned to a suitable level considerably below the surface where the water temperature approximates the discharge temperature. In the present invention, however, the cold water discharge is adjacent the surface in order to reduce the sea surface temperature and thus increase the heat flux to the sea surface from solar radiation. The result will be a reduction in temperature of the heat source which will reduce somewhat the performance of the power plant. However, this arrangement is carried out during the summer when the water temperature is warmest and this will compensate somewhat for the reduced performance of the plant.

The present invention contemplates that the OTEC power plant will be designed to perform the year-round and will be located where the plant will increase the summer heat storage. The present invention also contemplates that the power plant can be moved in summertime to a region wherein the weather is to be modified in the manner described above. The procedure for using an OTEC power plant as a mechanism for cooling the surface water in a large area in order to modify the weather is general in nature and is applicable to other types of power plants then that shown in FIG. 4. In general, the power plant will intake cold water from the depth of many hundreds of meters where the temperature is relatively cool, say 5 degrees Celsius. The cold water will absorb heat from the condenser and be discharged at some intermediate depth of say 200 meters. The warm water intake is close to the surface and will discharge, after heat has been extracted and work produced, at the bottom of the mixed layer which may be at about 50 meters deep. In this procedure, the heat which is discharged to the condenser may make the surface somewhat cooler and in this way would increase the absorption rate of solar radiation. Thus, the presence of an OTEC power plant will reduce the surface temperature of the water below its normal value. However, the heat storage of the upper layer will remain somewhat smaller because of utilization of the heat in the evaporator of the power plant.

In the present invention, however, the cold water discharge is close to the surface where it will be mixed with surface water. As indicated above, this will reduce somewhat the temperature of the surface and also the efficiency of the power plant. However, it will significantly increase the heat storage capacity of the water surrounding the power plant. Because the surface temperature during the summer is significantly higher than the winter, the overall temperature head will remain large enough average yearly conditions.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

We claim:

1. A method for modifying winter weather conditions in the vicinity of a continental arid zone eastward of a body of water including the step of cooling the surface water of said body of water only during the summer for reducing the heat lost therefrom during the summer whereby the amount of heat stored in the body of water during the summer is increased causing wintertime modification of the weather over the continental arid zone.

2. A method according to claim 1 wherein said body of water is an ocean.

3. A method according to claim 1 wherein said body of water is a sea.

4. A method according to claim 3 wherein said sea is the Mediterranean Sea.

5. A method according to claims 1 or 3 wherein said body of water is the Mediterranean Sea and said continental arid zone is Israel.

6. A method according to claim 1 wherein said body of water is a lake.

7. A method according to claim 1 wherein said continental arid zone is Israel.

8. A method for increasing the intensity and frequency of storms during the winter in a continental arid zone by cooling the surface of a body of water located westward of the zone only during the summer for reducing the heat lost from, and increasing the amount of heat stored in the body of water during the summer thereby causing wintertime modification of the weather over the continental arid zone.

9. A method according to claim 8 wherein the heat storage is increased by mixing relatively cooler deep water in said body of water with relatively warmer surface water to thereby reduce the surface temperature of the seas during the summer.

10. A method according to claim 9 wherein the mixing is achieved by pumping water from a lower level in said body of water to a upper level.

11. A method according to claim 10 wherein wave motion provides the mode of power for the pumping operation.

12. A method according to claim 9 wherein the mixing is achieved by paddles that are operated by wave motion.

* * * * *